United States Patent
Shahindoust et al.

(10) Patent No.: US 7,502,466 B2
(45) Date of Patent: Mar. 10, 2009

(54) SYSTEM AND METHOD FOR SECURE COMMUNICATION OF ELECTRONIC DOCUMENTS

(75) Inventors: Amir Shahindoust, Laguna Niguel, CA (US); David Honig, Irvine, CA (US); Michael Yeung, Mission Viejo, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 806 days.

(21) Appl. No.: 11/030,687

(22) Filed: Jan. 6, 2005

(65) Prior Publication Data

US 2006/0153374 A1    Jul. 13, 2006

(51) Int. Cl.
  *H04L 9/12* (2006.01)
  *H04L 9/22* (2006.01)
  *H04N 7/167* (2006.01)
  *H04L 9/32* (2006.01)

(52) U.S. Cl. .................... 380/44; 380/43; 380/239; 380/262

(58) Field of Classification Search ............. 380/44, 380/43, 262, 239
See application file for complete search history.

(56) References Cited

U.S. PATENT DOCUMENTS

| | | | | |
|---|---|---|---|---|
| 4,484,027 A | * | 11/1984 | Lee et al. | 380/239 |
| 4,864,616 A | | 9/1989 | Pond et al. | |
| 5,237,611 A | | 8/1993 | Rasmussen et al. | |
| 5,369,707 A | | 11/1994 | Follendore, III | |
| 5,412,730 A | * | 5/1995 | Jones | 380/46 |
| 5,455,862 A | | 10/1995 | Hoskinson | |
| 5,561,713 A | * | 10/1996 | Suh | 380/216 |
| 5,583,779 A | * | 12/1996 | Naclerio et al. | 705/408 |
| 5,621,799 A | * | 4/1997 | Katta et al. | 380/217 |
| 5,818,939 A | | 10/1998 | Davis | |
| 6,115,816 A | | 9/2000 | Davis | |
| 6,167,514 A | * | 12/2000 | Matsui et al. | 713/150 |
| 6,460,137 B1 | | 10/2002 | Akiyama et al. | |
| 7,003,667 B1 | * | 2/2006 | Slick et al. | 713/182 |
| 7,308,575 B2 | * | 12/2007 | Basil et al. | 713/168 |
| 2001/0037462 A1 | * | 11/2001 | Bengtson | 713/201 |
| 2002/0062451 A1 | | 5/2002 | Scheidt et al. | |
| 2003/0079120 A1 | | 4/2003 | Hearn et al. | |
| 2003/0217362 A1 | * | 11/2003 | Summers et al. | 725/63 |
| 2004/0184064 A1 | * | 9/2004 | TaKeda et al. | 358/1.13 |
| 2005/0062998 A1 | * | 3/2005 | Kumashio | 358/1.14 |
| 2007/0172066 A1 | * | 7/2007 | Davin | 380/262 |
| 2008/0106750 A1 | * | 5/2008 | Kim | 358/1.13 |

* cited by examiner

*Primary Examiner*—Michael J Simitoski
(74) *Attorney, Agent, or Firm*—Tucker Ellis & West LLP

(57) ABSTRACT

The present invention is directed to a system and method for secure communication of electronic documents to a document processing device. A document processing request containing electronic document data is received containing document data in an unencrypted form. A seed value is then received and used to generate a random number. The random number is used to encrypt the electronic document. The seed value, in a header, is transmitted, along with the encrypted electronic document, to a document processing device. The document processing device extracts the seed value from the header and uses the seed value to generate a random number. The encrypted document is then decrypted using the random number generated from the seed value. The document processing device subsequently performs the selected document processing operation on the decrypted electronic document.

6 Claims, 3 Drawing Sheets

SYSTEM AND METHOD FOR SECURE COMMUNICATION OF ELECTRONIC DOCUMENTS

BACKGROUND OF THE INVENTION

This invention teaches a system and method for the secure communication of electronic documents. More particularly, this invention is directed to a system and method for enabling secure data communication of a user's electronic documents without the user's intervention.

Document processing devices are routinely used in a network environment to generate or propagate electronic documents. One issue facing such environments is that the electronic document is able to be sniffed or intercepted by hackers or other unauthorized users. This is even more of an issue in those environments which allow wireless communication with the document processing devices. There is a need for a data security mechanism to deter or prevent unauthorized access to such electronic documents. Document transmission is suitably in conjunction with document forwarding, document storage, or document processing operations, such as printing, facsimile transmission, scanning, and the like.

Typically an encryption/decryption mechanism is used wherein a key is generated by a standard algorithm and the key is then used to encrypt and decrypt the electronic document. One problem with such encryption/decryption mechanisms is that the security of the encrypted document depends on the security level of the key. The algorithms used to generate the key are generally standard or well known and anyone skilled in the art could use the algorithms to decrypt the data is such person is able to determine the key.

Another problem with standard encryption/decryption mechanisms is that the exchange of the key between the encryption device and the decryption typically requires two-way communication between the devices. For example, SSL requires bi-directional communication and RSA public key methods require prior key distribution. It would be advantageous to have an encryption/decryption mechanism which only required unidirectional communication. One such option is to use a fix hard coded key that is used by the client device or use and the document processing device. However, there is minimal security in such a method as the key is easily determined by trial and error or by reverse engineering.

There is a need for a system and method for encryption/decryption of electronic documents which overcomes the aforementioned problems and enables secure communication of electronic documents easily and without user intervention.

SUMMARY OF THE INVENTION

In accordance with the present invention, there is provided a system and method for secure communication of electronic documents.

Further, in accordance with the present invention, there is provided a system and method for enabling secure data communication of a user's electronic documents without the user's intervention.

Further, in accordance with the present invention, there is provided a system and method for secure communication of electronic documents which uses unidirectional communication between the user and an associated document processing device and is transparent to the user.

Still further, in accordance with the present invention, there is provided a system for secure communication of electronic documents. The system includes means adapted for receiving a document processing request, wherein the document processing request includes document data representative of an unencrypted, electronic document. The system also includes means adapted for receiving a seed value and random number generation means adapted for generating a random number from the seed value. Preferably, the seed value is at least a 32 bit sequence. Encryption means adapted for encrypt the document data in accordance with the random number so as to generate encrypted document data and communication means adapted for communicating the encrypted document data to an associated document processing device. The system also comprises means adapted for communicating the seed value to the associated document processing device.

In a preferred embodiment, the system further comprises a document processing device which includes means adapted for receiving the encrypted document data and the seed value and means adapted for generating the random number from the seed value. The document processing device also includes decryption means adapted for decrypting the encrypted document data to re-generate the document data and means adapted for commencing a selected document processing operation on the document data.

Preferably, the encryption means include means adapted for encrypting the seed value in accordance with the random number so as to generate an encrypted seed value. In a more preferred embodiment, the decryption means include means adapted for decrypting the encrypted seed value.

In one embodiment, the system also comprises means adapted for supplying a selected encryption/decryption algorithm to the encryption means and the decryption means.

In another embodiment, the system includes means adapted for appending the seed value to the encrypted document data so as to communicate the seed value with the encrypted document data to the associated document processing device. Preferably, the seed value is appended as header data of the encrypted document data.

Still further, in accordance with the present invention, there is provided a method for secure communication of electronic documents. The method comprises the step of receiving a document processing request, wherein the document processing request includes document data representative of an unencrypted, electronic document. The method also includes receiving a seed value and generating a random number from the seed value. Preferably, the seed value is at least a 32 bit sequence. The document data is encrypted in accordance with the random number so as to generate encrypted document data and the encrypted document data is then communicated to an associated document processing device. The seed value is also communicated to the associated document processing device.

In a preferred embodiment, the method further comprises the steps of receiving the encrypted document data and the seed value at the associated document processing device and generating the random number from the seed value. The encrypted document data is decrypted to re-generate the document data and selected document processing operation is commenced on the document data.

Preferably, the method includes the step of encrypting the seed value in accordance with the random number so as to generate an encrypted seed value. In a more preferred embodiment, the method also includes the step of decrypting the encrypted seed value.

In a preferred embodiment, the method also includes supplying a selected encryption/decryption algorithm to the encryption means and the decryption means.

In one embodiment, the seed value is appended to the encrypted document data so as to communicate the seed value with the encrypted document data to the associated document processing device. Preferably, the seed value is appended as header data of the encrypted document data.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for secure communication of electronic documents. More particularly, this invention provides a system and method for secure data communication of a user's electronic documents without the user's invention. The system and method enable secure communication of electronic documents to an associated document processing device which uses an encryption/decryption mechanism only requiring unidirectional communication between the user device or client module and the document processing device and which is transparent to the user.

Figure 1:
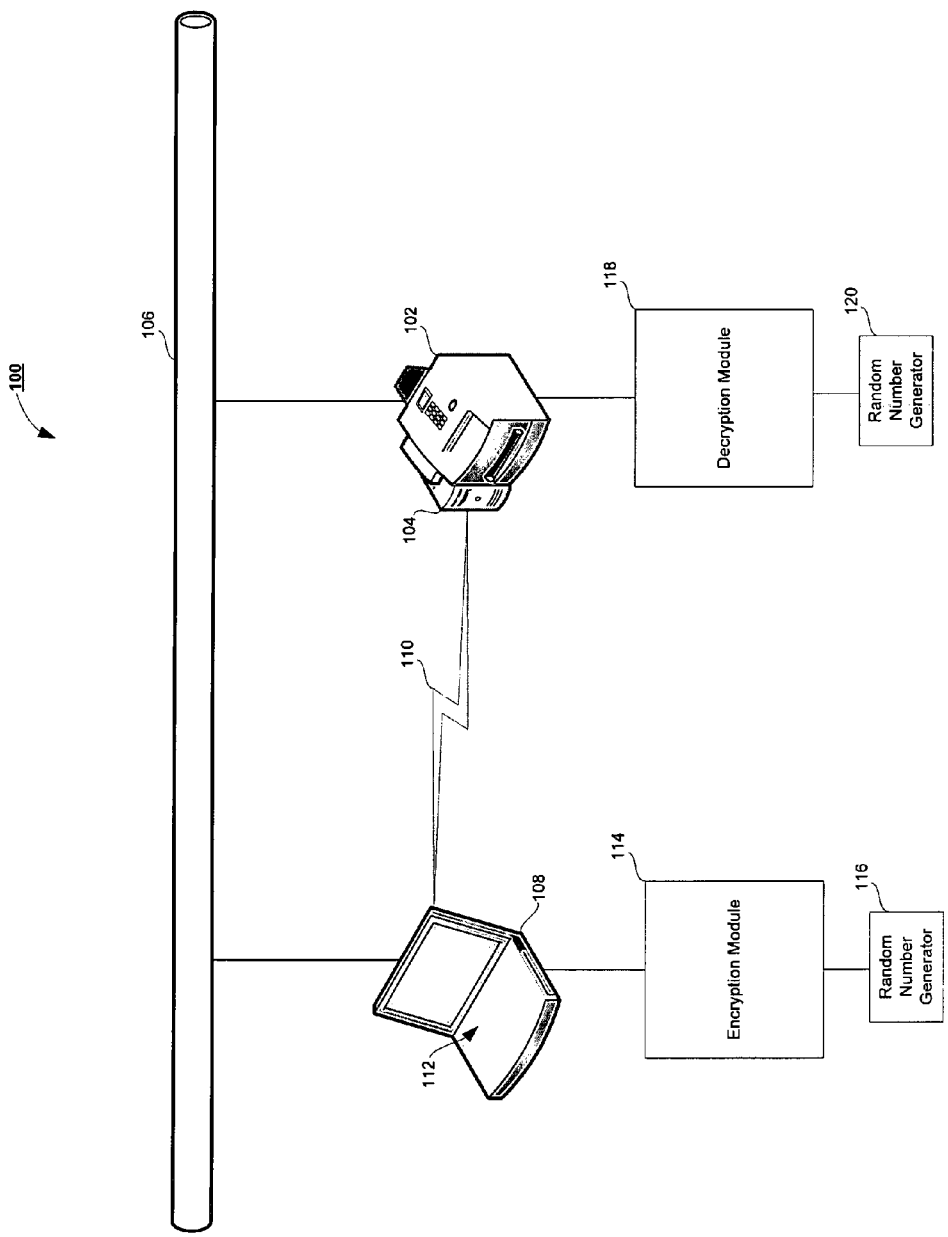
FIG. 1 is a block diagram illustrative of the system of the present invention.

FIG. 1 illustrates a block diagram preferred embodiment of the system according to the present invention generally designated as 100. The system comprises at least one document processing device, as illustrated by multifunction peripheral device 102, for generating or processing image data. It is to be appreciated that the document processing device 102 is any suitable document processing device known in the art, such as a copier, printer, scanner, facsimile and the like, or any combination thereof. Suitable commercially available document processing peripherals include, but are not limited to, the Toshiba e-Studio Series Controller.

The document processing device 102 of the system 100 further comprises a controller 104, which controls the functions of the document processing device 102 as will be appreciated by one of ordinary skill in the art. The controller 104 is capable of being externally or internally coupled to the multifunctional peripheral device 102. The controller 104 is advantageously any hardware, software, or combination thereof suitably capable of controlling the functioning of the document processing device 102 as will be appreciated by one of ordinary skill in the art.

Preferably, the document processing device 102 is communicatively coupled to a computer network 106. The computer network 106 includes at least one computer, workstations, wireless devices, or other suitable user device 108 which enables the user to communicate and use the capabilities of the document processing device 102. It is understood that the computer network 106 may suitably comprise additional computers, workstations, wireless devices, or other suitable device by which the user is able to communicate with and use the capabilities of the document processing device 102.

The network 106 is suitably any suitable network known in the art, for example and without limitation, Ethernet, Token Ring, or the Internet. The user device 108 transmits data to the document processing device 102 through the controller 104 over the computer network 106. It will be appreciated by those skilled in the art that the document processing device 102 need not be coupled to the computer network 106, but rather is suitably in a stand-alone mode, i.e. connected to a single computer or user device. The skilled artisan will understand that such a stand-alone configuration will not affect the operation of the present invention with respect thereto.

The user device 108 communicates with the controller 104 of the document processing device 102 via a suitable communications link 110. As will be understood by those skilled in the art, the communications link 110 is any means for communication between two electronic devices, for example and without limitation, 802.x, an Ethernet based network, infrared connection, Wi-Fi connection, telephone connection, cellular telephone connection, Bluetooth connection and the like. The skilled artisan will appreciate that the communications link 110 is capable of being implemented over a computer network 106 or by directly connecting the user device 108 to the controller 104 of the multifunctional peripheral device 102.

Preferably, the user device 108 includes an associated user interface 112 by which an associated user requests document processing operations and selects the parameters associated therewith. The user interface 112 preferably includes a display means for displaying information related to secure document processing. It will be appreciated that viable user interfaces suitably take various forms, such as touch screen, keypads, pen input, and the like.

In the preferred embodiment, the user device 108 is also in data communication with an encryption module 114 to encrypt the electronic document data to be transmitted to the document processing device 102. The encryption module 114 is capable of being externally or internally coupled to the user device. Preferably, the encryption module includes a random number generator 116 for generating random numbers to serve as a key to use to encrypt the electronic document data. The random number generator 116 is suitably either externally or internally coupled to the encryption module 114. As will be appreciated by one of ordinary skill in the art, conventional random number generators typically require that a starting value or seed be input. The seed value allows for generation of a string of random numbers. If a specific generator is used, the same string of random numbers will be generated each time operation is commenced with a specified seed value.

Preferably, the document processing device 102 is in data communication with a decryption module 118 to decrypt the electronic document data to regenerate the electronic document data for document processing. The decryption module 118 is suitably a stand-alone component or integrated into the controller 104 of the document processing device 102. The decryption module 118 incorporates a random number generator 120, which random number generator employs the same generator as that of random number generator 116. Thus when random number generator 120 is supplied with the same seed value used by random number generator 116, the same key will be generated. Thus, the system provides for secure transmission of encrypted document data and a seed value that is of no use for decryption unless the precise random number generator is also known.

Figure 2:
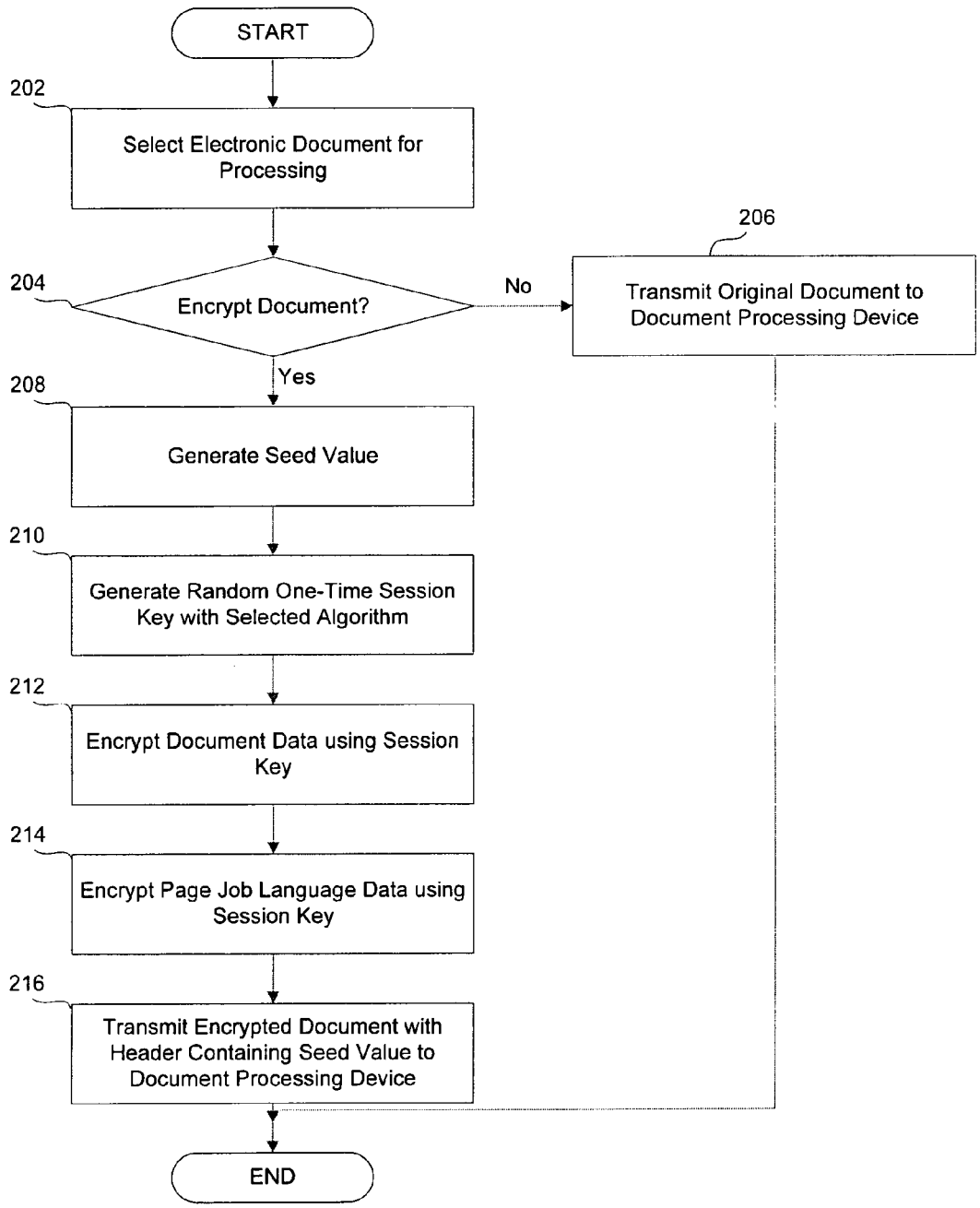
FIG. 2 is a flowchart illustrating encryption process according to the present invention.

FIG. 2 is a flowchart illustrating the encryption process according to the present invention. At 202, a user selects an electronic document for document processing via the user device. At 204, a determination is made via any suitable means whether the electronic document is to be encrypted prior to transmission to the document processing device. For example, when selecting the parameters for the document processing operation, the user may select whether the document is to be encrypted. In another embodiment, the system is suitably configured such that certain types of document are encrypted, documents transmitted from certain user devices are encrypted, documents generated by certain users are encrypted, or all documents are encrypted.

If the electronic document is not to be encrypted, then flow proceeds to 206, wherein the original document, without encryption, is transmitted to the document processing device. If the electronic document is to be encrypted, flow proceeds to 208 wherein a specified seed value is generated via any suitable means, such as via a user selection table, operation specific values, site specific values, or the like. Also, values, such as a time stamp on the document suitably also serve as a suitably seed value. Preferably, a platform specific random number generator generates the seed value. At 210, the seed value is then subjected to a selected algorithm via any suitable means to generate a random one-time session key.

At 212, the random session key is used to encrypt the electronic document data via any suitable means. As will be appreciated by those skilled in the art, in the preferred embodiment, the present invention makes use of the Triple-Data Encryption Standard ("3DES") encryption algorithm. This governmental standard is contained in the standards document number ANSI X9.52-1998 *Public Key Cryptography For The Financial Services Industry: Triple Data Encryption Algorithm Modes of Operation*, incorporated herein. Other suitable encryption algorithms include Advanced Encryption Standard, Riverst-Shamir-Adelman (RSA), Diffie-Hellman, Digital Signature Standard (DSS), ElGamal, LUC, Blowfish, International Data Encryption Algorithm (IDEA), RC4, SAFER, and Enigma.

At 214, the random session key is also used to encrypt information related to electronic document, such as the page job language information. Preferably, the seed value is also encrypted. Preferably, the encrypted page job language information and encrypted seed value is appended to the electronic document as a header.

At 216, the encrypted electronic document with the header containing the encrypted related information and seed value are transmitted to the document processing device via any suitable means.

Figure 3:
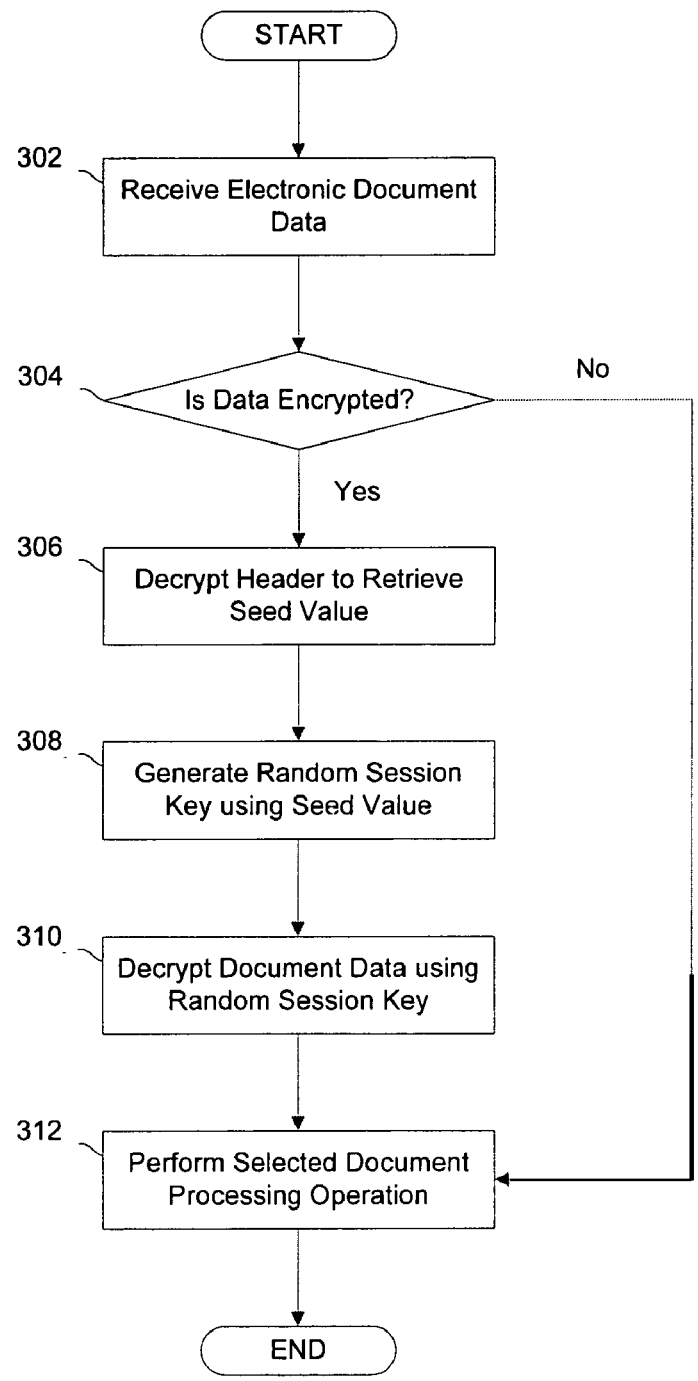
FIG. 3 is a flowchart illustrating the decryption process according to the present invention.

FIG. 3 is a flowchart illustrating the decryption process according to the present invention. At 302, electronic document data is received at the document processing device. At 304, a determination is made whether the electronic document data is encrypted. If the document is not encrypted, flow proceeds to 312, wherein the selected document processing operation is performed on the electronic document data.

If the document is encrypted, flow proceeds to 306, wherein the header containing the encrypted seed value is decrypted via any suitable means. Once the seed value has been decrypted, the seed value is used to generate the random session key as shown at 308. The seed value is subjected to a selected algorithm via any suitable means to generate a random one-time session key.

At 310, the electronic data is decrypted using the random session key via any suitable means to regenerate the electronic document data. At 312, the selected document processing operation is performed on the electronic document data.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system for secure communication of electronic documents comprising:
   a user device including,
      means adapted for receiving a document processing request, which document processing request includes document data representative of an unencrypted, electronic document,
      means adapted for generating page job language information, which page job language information is adapted to control operation of an associated document processing device, in accordance with a received document processing request,
      means adapted for generating a seed value,
      a user device random number generation means adapted for generating a random number from the seed value,
      encryption means adapted for encrypting the document data in accordance with the random number so as to generate encrypted document data;
      seed encryption means adapted for encrypting the seed value in connection with key data,
      means adapted for embedding the encrypted seed value and the page job language information associated with the encrypted document data as a header to the encrypted document data,
      a user device data interface, and
   communication means adapted for communicating the encrypted document data and a header inclusive of the page job language information and the encrypted seed value to an associated document processing device via the data interface; and a document processing device including,
- a document processing device data interface in data communication with the user device data interface,
- means adapted for receiving the encrypted document data and the header inclusive of the page job language information and the encrypted seed value via the document processing device data interface,
- a data storage associated with the document processing device adapted for storing a copy of the key data,
- means adapted for extracting the encrypted seed value from the header,
- means associated with the document processing device adapted for decrypting the extracted encrypted seed value in accordance with the copy of the key data in the data storage,
- a document processing device random number generation means adapted for generating a random number from the decrypted seed value,
- means adapted for decrypting the encrypted document data in accordance with the random number generated by the document processing device random number generation means, and
- means adapted for commencing a document processing operation on the document processing device on the decrypted document data in accordance with a received document processing request and the page job language information.

2. The system for secure communication of electronic documents of claim 1, wherein in the seed value is a 32 bit sequence.

3. A method for secure communication of electronic documents comprising the steps of:
- receiving, at an associated user device, a document processing request, which document processing request includes document data representative of an unencrypted, electronic document;
- generating, at the user device, page job language information, which page job language information is adapted to control operation of an associated document processing device, in accordance with a received document processing request;
- generating, at the user device, a seed value;
- generating, at the user device, a random number from the seed value;
- encrypting, at the user device, the document data in accordance with the random number so as to generate encrypted document data;
- encrypting, at the user device, the seed value in connection with key data;
- embedding, at the user device, the encrypted seed value and page job language information associated with the encrypted document data and the document processing request in a header of the encrypted document data;
- communicating the encrypted document data and the header inclusive of the page job language information and the encrypted seed value to an associated document processing device via a user interface associated with the user device;
- receiving, at a document processing device user interface associated with the associated document processing device, the encrypted document data and the header inclusive of the page job language information and the encrypted seed value;
- storing a copy of the key data in a data storage associated with the document processing device;
- extracting, via the document processing device, the encrypted seed value from the header;
- decrypting, via the document processing device, the extracted encrypted seed value in accordance with a copy of the key data in the data storage;
- generating, via the document processing device, a random number from the decrypted seed value;
- decrypting, via the document processing device, the encrypted document data in accordance with the random number generated by the document processing device; and
- commencing a document processing operation on the document processing device on the decrypted document data in accordance with a received document processing request and the page job language information.

4. The method for secure communication of electronic documents of claim 3 wherein in the seed value is a 32 bit sequence.

5. A computer-readable medium of instructions with computer-readable instructions stored thereon for secure communication of electronic documents comprising the steps of:
- instructions for receiving, at an associated user device, a document processing request, which document processing request includes document data representative of an unencrypted, electronic document;
- instructions for generating, at the user device, page job language information, which page job language information is adapted to control operation of an associated document processing device, in accordance with a received document processing request;
- instructions for generating, at the user device, a seed value;
- instructions for generating, at the user device, a random number from the seed value;
- instructions for encrypting, at the user device, the document data in accordance with the random number so as to generate encrypted document data;
- instructions for encrypting, at the user device, the seed value in connection with key data;
- instructions for embedding, at the user device, the encrypted seed value and page job language information associated with the encrypted document data and the document processing request in a header of the encrypted document data;
- instructions for communicating the encrypted document data and the header inclusive of the page job language information and the encrypted seed value to an associated document processing device via a user interface associated with the user device;
  - instructions for receiving, at a document processing device user interface associated with the associated document processing device, the encrypted document data and the header inclusive of the page job language information and the encrypted seed value;
- instructions for storing a copy of the key data in a data storage associated with the document processing device;
- instructions for extracting, via the document processing device, the encrypted seed value from the header;
- instructions for decrypting, via the document processing device, the extracted encrypted seed value in accordance with a copy of the key data in the data storage;
- instructions for generating, via the document processing device, a random number from the decrypted seed value;
- instructions for decrypting, via the document processing device, the encrypted document data in accordance with the random number generated by the document processing device; and
- instructions for commencing a document processing operation on the document processing device on the decrypted document data in accordance with a received document processing request and the page job language information.

6. A computer-implemented method for secure communication of electronic documents comprising the steps of:
   receiving, at an associated user device, a document processing request, which document processing request includes document data representative of an unencrypted, electronic document;
   generating, at the user device, page job language information, which page job language information is adapted to control operation of an associated document processing device, in accordance with a received document processing request;
   generating, at the user device, a seed value;
   generating, at the user device, a random number from the seed value;
   encrypting, at the user device, the document data in accordance with the random number so as to generate encrypted document data;
   encrypting, at the user device, the seed value in connection with key data;
   embedding, at the user device, the encrypted seed value and page job language information associated with the encrypted document data and the document processing request in a header of the encrypted document data;
   communicating the encrypted document data and the header inclusive of the page job language information and the encrypted seed value to an associated document processing device via a user interface associated with the user device;
   receiving, at a document processing device user interface associated with the associated document processing device, the encrypted document data and the header inclusive of the page job language information and the encrypted seed value;
   storing a copy of the key data in a data storage associated with the document processing device;
   extracting, via the document processing device, the encrypted seed value from the header;
   decrypting, via the document processing device, the extracted encrypted seed value in accordance with a copy of the key data in the data storage;
   generating, via the document processing device, a random number from the decrypted seed value;
   decrypting, via the document processing device, the encrypted document data in accordance with the random number generated by the document processing device; and
   commencing a document processing operation on the document processing device on the decrypted document data in accordance with a received document processing request and the page job language information.

* * * * *